United States Patent Office 3,705,814
Patented Dec. 12, 1972

3,705,814
DIRECTLY EDIBLE, COMPACTED AND DEHYDRATED FRUIT BAR
Abdul R. Rahman and Glenn R. Schafer, Natick, Mass., assignors to the United States of America as represented by the Secretary of the Army
No Drawing. Filed Aug. 20, 1970, Ser. No. 65,700
Int. Cl. A23b 7/00, 7/16
U.S. Cl. 99—204
5 Claims

ABSTRACT OF THE DISCLOSURE

Directly edible, compacted, dehydrated fruit bars which are relatively soft and chewy and method of making the same comprising applying from about 1 percent to about 5 percent by weight of lecithin to the surface of comminuted fruit particles after dehydration to a moisture content of from about 7 percent to about 14 percent by weight and prior to compression thereof, to form a compacted fruit bar which is directly edible without prior rehydration.

---

The invention described herein may be manufactured, used, and licensed by or for the Government for governmental purposes without the payment to us of any royalty thereon.

This invention relates to a method of making directly edible, compacted, dehydrated fruit bars and a method of making such fruit bars so that they may be eaten without prior rehydration. The invention also relates to the directly edible compacted, dehydrated fruit bars.

Compacted, dehydrated food bars have been utilized by the Armed Forces in field rations, by astronauts during space explorations, by earth explorers, hikers, and others who must carry their food supplies along with them. An outstanding advantage of rations in this form is that they provide highly concentrated nutritional values in compact and convenient forms. They also may be stored for considerable periods of time without spoilage, especially when the moisture content is sufficiently low to prevent growth of microorganisms in the compacted food bars.

One of the outstanding problems encountered with fruit bars is that when they are compacted by application of pressure in the formation of the bars, if the moisture content is as low as is desirable for stability, the fruit bars become so hard that they are extremely difficult to eat directly without rehydration. In some cases they have been known to become so hard that, when an attempt is made to eat them directly, they have caused breakage of teeth. On the other hand, if enough moisture is left in the compacted fruit bars to permit direct eating of the bars without danger of damage to teeth, the fruit bars may be unstable in long-term storage. Further, they may be very difficult to form because of the extrusion of the fruit pulp from the mold during compression in forming the bars.

It is an object of the present invention to provide a method of making compacted, dehydrated fruit bars which may be eaten directly without prior rehydration and without causing damage to the teeth of the consumer thereof.

It is also an object of the invention to provide compacted, dehydrated fruit bars which may be eaten directly without prior rehydration thereof and without causing damage to the teech of the consumer thereof.

Other objects and advantages will be apparent from the following description of the invention, and the novel features will be particularly pointed out hereinafter in connection with the appended claims.

Applicants' novel directly edible, compacted and dehydrated fruit bar is comprised of one or a plurality of fruits suitably subdivided and coated with a lecithin or modified lecithin containing composition and dried to a moisture content in the range of from about 7 percent to about 14 percent on a weight basis, then compressed at a pressure of from about 200 p.s.i. to about 3000 p.s.i. into bar form of such dimensions as to facilitate the direct eating of the bar without prior rehydration thereof.

Applicants have discovered that a relatively small quantity of lecithin or a modified lecithin, usually less than 5 percent by weight, when well distributed through a fruit bar on the surfaces of the subdivided partciles that are compressed together to form the fruit bar produces a change in the texture of the fruit bar such that the resulting compacted fruit bar can be easily bitten through and chewed without damage to the teeth of the consumer and with enjoyment in contrast to the difficulty with which a similar fruit bar lacking the lecithin or modified lecithin can be eaten directly. The lecithin or modified lecithin used in making applicants' compacted, dehydrated fruit bar is an edible lecithin or modified lecithin. It may be derived from various natural sources, but the lecithins or modified lecithins produced from the natural lecithin of soybeans have been found to be particularly effective for this purpose. In general, lecithins are phosphatides and more particularly diglycerides of aliphatic acids linked to the choline ester of phosphoric acid. The modified lecithin may, for example, be a hydroxylated lecithin. A number of such lecithin products or modified lecithin products are manufactured by the Central Soya Company, Inc., Chemurgy Division, Chicago, Ill. and are described in a technical sales manual published by Central Soya Co. entitled "Lecithins," the edible forms of which are useful in accordance with the present invention.

The lecithin or modified lecithin may be applied to the particles of subdivided fruit as a solution, such as soybean oil solution, or as a spray, such as an aerosol spray employing a non-toxic propellant. Gibraltar Industries, Inc., Chicago, Ill. produces an aerosol spray of lecithin under the trade name "PAM" pure vegetable food release which contains about 12 percent pure lecithin and is useful for spray-coating the particles of fruit prior to compression thereof to form compacted fruit bars. If applied to the food particles in the form of a soybean oil solution, it is preferred to use a solution having a concentration of about 15 percent lecithin on a weight basis, such as "Centromix C," manufactured by Central Soya Company. A purer form of lecithin manufactured by Central Soya Company and sold as "RG Lecithin" may also be used, but costs much more than other edible forms of lecithin mentioned above.

Generally speaking, the fruit is subdivided to form particles of from about ⅛ inch to about ½ inch in the longest dimension and the particles are dried to from about 7 percent to about 14 percent moisture content by weight prior to the application of the lecithin or modified lecithin containing composition thereto. A sufficient amount of the solution or suspension of the lecithin or modified lecithin is applied to the particles of fruit to obtain a reasonably uniform coating on the particles of from about 1 percent to about 5 percent of lecithin or modified lecithin on a weight basis. About 2 percent lecithin or modified lecithin has been found to be particularly effective.

In general, if the fruit particles are dried to less than 7 percent moisture content before the application of the lecthin thereto and the compression thereof, the compressed fruit bar will be too hard for ease or comfort in eating the bars directly even though lecithin has been added. On the other hand, if the moisture content of the fruit particles is greater than about 14 percent, the fruit is difficult to compress into bars because of its tendency to be extruded from the mold when the moisture content of the fruit is too great.

In general, if less than about 1 percent of lecithin is applied to the fruit, it will be insufficient to render the compressed dehydrated fruit sufficiently mealy in texture to permit one to bite a compacted fruit bar without danger of damaging the teeth. On the other hand, if more than about 5 percent of lecithin is applied, the fruit pulp is inclined to be extruded from the mold, much as when the moisture content is greater than 14 percent.

The pressure required in compressing the subdivided fruit coated with lecithin or modified lecithin will, in general, depend on the amount of moisture in the fruit. The lower the moisture content of the fruit down to as low as 7 percent, the higher the pressure required, up to 3000 p.s.i., to obtain a fruit bar of the proper degree of adhesion. The higher the moisture content of the fruit, up to as high as 14 percent, the lower the pressure required, down to 200 p.s.i., to obtain a fruit bar of the proper degree of adhesion. The type of fruit has some effect on the pressure required, figs and pears in general requiring higher pressures than most other fruits.

The invention has been found to be particularly effective with dried dates, raisins, cherries, figs, and pears. However, it may also be applied to other fruits; also other components, such as edible seeds and nuts, may be added to the fruits in order to impart variety and interest to compressed fruit bars. Also, cereals, proteins, fats, chocolate, spices, and various other flavoring or chemical additives may be incorporated in the compressed fruit bars in minor proportions in relation to the fruit components.

We will now proceed to disclose several specific examples of the production of directly edible, compacted, dehydrated fruit bars in accordance with the above-described principles. It will be understood, of course, that the above-enumerated and other advantages of our invention may also be accomplished by suitable variations in the detailed method steps, about to be set forth below, which are intended to be for illustrative purposes, and not for the purpose of limiting the scope of our invention. The percentages included throughout this disclosure are on a weight basis.

EXAMPLE I

Dates were diced to form particles having a maximum dimension of about 0.5 inch. The particles of diced dates were air dried to a moisture content of about 8 percent, then spread out in a pan and spray-coated as uniformly as possible over the surfaces of the particles with "PAM," and aerosol solution of lecithin manufactured by Gibraltar Industries, Inc., until an add-on of about 2.0 percent by weight was obtained. The particles coated with the lecithin solution were placed in a mold and compressed at 400 pounds per square inch pressure to form a bar of the dimensions 3 x 1 x 0.5 inches. The bars were stored overnight in a closed airtight container, then tested with an Instron Universal Testing Apparatus, Floor Model TT–DM, manufactured by the Instron Corporation, using a 500 kg. cell. The bars were penetrated at 50 percent of their initial thickness at a speed of 2 cm. per minute using a cylindrical, flat-surfaced, punch having a diameter of 0.75 cm. The results in Table I were obtained, the sample numbers representing individual bars while the letters following the sample numbers represent replicate penetrations of the same bar. Firmness is represented by the force at 50 percent penetration. Toughness is represented by the work expended in penetrating to 50 percent of initial thickness. Hardness is represented by the maximum force applied during the penetration.

TABLE I

|  | Firmness (force at 50 percent penetration), kg. | Toughness (work expended for 50 percent penetration), kg·cm. | Hardness (maximum force), kg. |
| --- | --- | --- | --- |
| Sample with lecithin: | | | |
| 1a | 3.4 | 2.94 | 4.4 |
| 1b | 3.1 | 2.60 | 4.0 |
| 2a | 4.8 | 3.33 | 4.8 |
| 2b | 5.3 | 4.48 | 6.2 |
| 2c | 5.6 | 4.26 | 6.0 |
| 3a | 5.2 | 4.21 | 5.8 |
| 3b | 6.0 | 4.01 | 6.0 |
| 3c | 7.4 | 5.12 | 7.4 |
| Average | 5.1 | 3.86 | 5.6 |
| Sample without lecithin: | | | |
| 1a | 5.6 | 4.32 | 7.0 |
| 1b | 5.4 | 4.30 | 7.4 |
| 1c | 4.8 | 3.40 | 5.6 |
| 2a | 5.8 | 4.80 | 6.0 |
| 2b | 7.6 | 5.45 | 7.6 |
| 2c | 7.0 | 4.80 | 7.0 |
| 3a | 9.0 | 6.13 | 9.0 |
| 3b | 9.0 | 7.25 | 10.0 |
| 3c | 10.2 | 7.30 | 10.2 |
| 4a | 6.0 | 4.19 | 6.2 |
| 4b | 6.0 | 4.49 | 6.8 |
| 4c | 6.4 | 4.65 | 6.6 |
| Average | 6.9 | 5.09 | 7.4 |

EXAMPLE II

Dates, figs, cherries, and almonds were diced to form particles having a maximum dimension of about 0.5 inch. These particles, as well as sesame seeds were mixed in the proportions shown in Table II and the separate mixtures were spread out in pans and spray-coated in substantially in same manner as for the date particles in Example I. The separate mixtures were placed in molds and compressed at about 1000 to 1500 p.s.i. to form bars of the dimensions 3 x 1 x 0.5 inch. These bars were subjected to technological taste panel testing initially and after periods of storage at 100 degrees F. as shown in Table II with the results shown in terms of a nine-point hedonic scale, the numbers in Table II representing the average of ten expert technological taste tester's evaluations of the samples, the lowest value in the scale, i.e., 1 representing extreme dislike, and the highest value in the scale, i.e. 9, representing extreme like, and a value of 5 representing neither like, nor dislike, and therefore borderline acceptability.

TABLE II

| Sample | Ingredient | Percent | Storage | Color | Odor | Flavor | Texture |
| --- | --- | --- | --- | --- | --- | --- | --- |
| A | Date | 39 | [1]0 | 7.3 | 7.3 | 7.4 | 7.1 |
|  | Fig | 24 | 1½ | 7.5 | 7.1 | 7.0 | 7.0 |
|  | Cherry | 25 | 3 | 7.1 | 6.8 | 7.0 | 6.8 |
|  | Almond | 10 | 6 | 6.9 | 6.6 | 6.9 | 6.4 |
|  | Lecithin | 2 |  |  |  |  |  |
| B | Date | 49 | [1]0 | 7.1 | 6.3 | 6.6 | 6.3 |
|  | Cherry | 49 | 1½ | 7.3 | 7.1 | 7.3 | 6.3 |
|  | Lecithin | 2 | 3 | 7.5 | 7.3 | 7.2 | 6.7 |
|  |  |  | 6 | 7.3 | 7.3 | 7.2 | 6.7 |
| C | Date | 78 | [1]0 | 7.4 | 6.7 | 6.9 | 7.0 |
|  | Sesame | 20 | 1½ | 7.1 | 6.5 | 6.2 | 6.9 |
|  | Lecithin | 2 | 3 | 7.4 | 6.7 | 6.2 | 6.8 |
|  |  |  | 6 | 6.8 | 6.6 | 5.5 | 6.8 |

[1] Initial.

Some of the above mixtures of particles were compressed under similar pressure conditions but without application of lecithin thereto. The resulting bars were so hard to bite into that no satisfactory taste test comparison could be made either initially or after the storage periods applied to the bars containing lecithin since to carry out such tests would have gravely endangered the teeth of the members of the panel to breakage.

While the lecithin and modified lecithin described above are preferably derived from soy beans, it is to be understood that lecithin and modified lecithin to be used in accordance with the present invention may be derived from other sources, such as egg yolk, the vital organs of animals, such as the liver, the kidneys, the brains, or various vegetable products other than soy beans, particularly certain seeds, nuts, and grains. The important consideration is that the material added to the surfaces of the particles of dried fruits before compression thereof should comprise an effective quantity of one or more phosphatide moiety-containing compounds. The lecithin or modified lecithin may be dissolved in or dispersed in a wide variety of solvents or dispersion media. It is preferably dissolved or dispersed in a medium which evaporates readily and leaves very little if any added moisture in the dried fruit particles, thus rendering unnecessary further drying of the coated dried fruit particles prio to compession thereof.

It will be apparent that we have provided a relatively simple and economical method for making compacted, dehydrated fruit bars which are directly edible without prior rehydration and without causing damage to the teeth of the consumer of the bars. Further, the fruit bars produced in accordance with the invention are appreciably more acceptable than fruit bars prepared similarly except omitting addition of the lecithin or modified lecithin prior to compression of the subdivided dried fruit. A further advantage of the method of the invention resides in the ease with which the compressed, dehydrated fruit bars are removed from the molds in which they are compressed in comparison with the difficulties of removing similarly prepared compressed, dehydrated fruit bars in which the fruit particles have not had lecithin or modified lecithin applied to the fruit particles prior to compression thereof.

We wish it to be understood that we do not desire to be limited to the exact details described herein, for obvious modifications will occur to a person skilled in the art.

We claim:

1. A method of making a directly edible, easily bitable and chewable, compacted fruit bar of low moisture content which comprises the steps consisting essentially of: (a) comminuting fruit having a moisture content greater than about 14 percent by weight to discrete particles, (b) drying said particles to a moisture content of from about 7 percent to about 14 percent by weight, (c) coating said particles with from about 1 percent to about 5 percent by weight of a lecithin or a modified lecithin, said coating being substantially uniformly distributed over the surfaces of said particles, and then (d) compressing a plurality of said coated particles at a pressure of from about 200 p.s.i. to about 3,000 p.s.i. to cause said particles to adhere together; whereby a compacted fruit bar consisting essentially of said compressed fruit particles coated with said lecithin or modified lecithin is obtained which is directly edible and easily bitten and chewed without rehydration prior to consumption thereof.

2. A method of making a directly edible, easily bitable and chewable, compacted fruit bar of low moisture content in accordance with claim 1, wherein said step of compressing said coated particles is carried out at a pressure of from about 1000 p.s.i. to about 1500 p.s.i.

3. A method of making a directly edible, easily bitable and chewable, compacted fruit bar of low moisture content in accordance with claim 1, wherein said step of coating said particles is carried out with about 2 percent by weight of a lecithin or a modified lecithin based on the weight of said particles.

4. A method of making a directly edible, easily bitable and chewable, compacted fruit bar of low moisture content in accordance with claim 1, wherein in said step of comminuting said fruit to discrete particles said fruit is comminuted to particles having a longest dimension of from about ⅛ inch to about ½ inch.

5. A method of making a directly edible, easily bitable and chewable, compacted fruit bar of low moisture content in accordance with claim 1, wherein said step of coating said particles is carried out with lecithin or a modified lecithin derived from soy beans.

References Cited

UNITED STATES PATENTS

| | | | |
|---|---|---|---|
| 2,470,281 | 5/1949 | Allingham | 99—168 X |
| 2,744,019 | 5/1956 | Snyder et al. | 99—168 X |
| 3,385,715 | 5/1968 | Ishler et al. | 99—204 |
| 3,356,509 | 12/1967 | Laval, Jr. | 99—168 X |
| 2,909,435 | 10/1959 | Watters et al. | 99—168 |

OTHER REFERENCES

Lawler "Military Creates New Foods" Food Engineering (May, 1966), pp. 52–56 and 68.

S. LEON BASHORE, Primary Examiner

A. D'ANDREA, JR., Assistant Examiner

U.S. Cl. X.R.

99—168